May 25, 1926.  
G. A. JOHNSON  
1,586,312  
FRICTION SHOCK ABSORBING MECHANISM  
Filed May 28, 1924
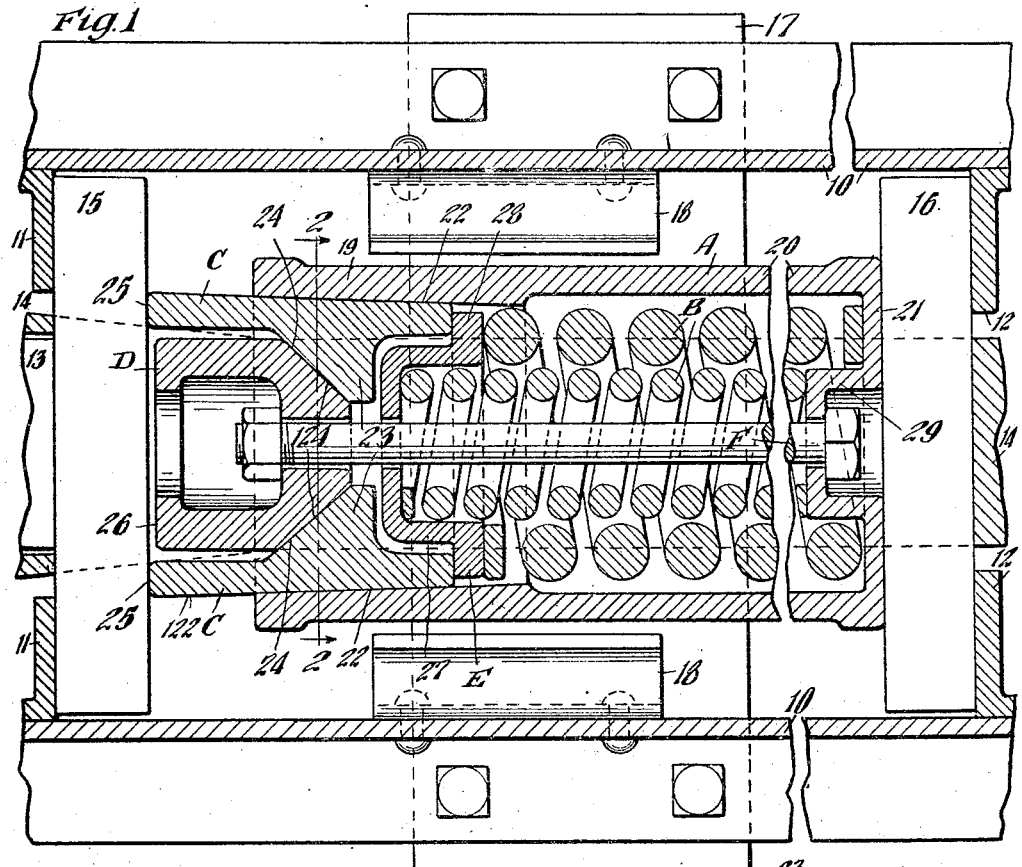
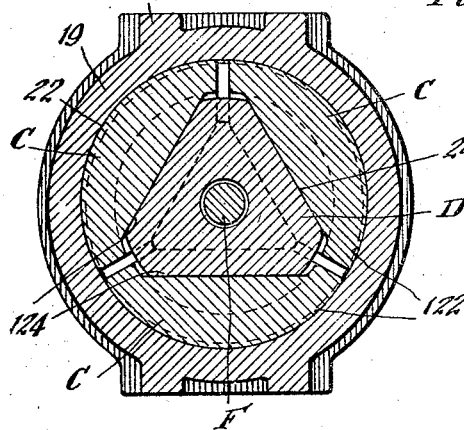
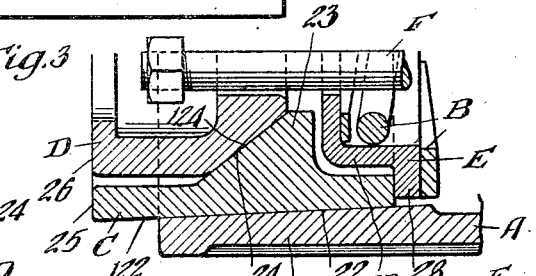
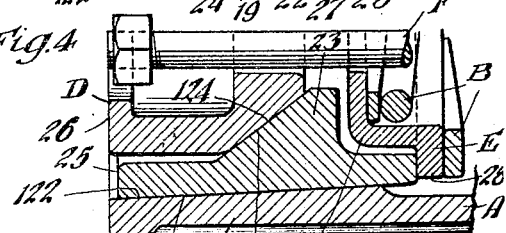
Witnesses  
Wm. Geiger
Inventor  
George A. Johnson  
By George J. Haight  
His Atty.

Patented May 25, 1926.

1,586,312

UNITED STATES PATENT OFFICE.

GEORGE A. JOHNSON, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed May 28, 1924. Serial No. 716,292.

This invention relates to improvements in friction shock absorbing mechanisms.

One object of the invention is to provide a friction shock absorbing mechanism, especially adapted for railway draft riggings, wherein are obtained light resistance during initial or preliminary action, and automatic change to a high final frictional resistance during the compression stroke.

Another object of the invention is to provide a mechanism of the character indicated, wherein the light shocks are absorbed mainly by a spring resistance element and the heavier shocks are absorbed by the combined action of friction elements and the spring resistance.

A still further object of the invention is to provide, in a mechanism of the character indicated, a spring resisted wedge system including friction shoes coacting with a friction member, wherein the wedge system is so arranged that during the initial action and for a predetermined portion of the compression stroke, the friction shoes are directly actuated from the usual main follower of the gear independently of a true wedging or spreading action, the wedge means subsequently being directly actuated with the result that a true wedging or spreading action is set up in the wedge system effectively forcing the friction shoes against the shell during the remainder of the compression stroke.

Another object of the invention is to provide a spring friction shock absorbing mechanism having the parts so arranged and functioning that a substantially sole spring resistance is afforded for a predetermined portion of the compression stroke, automatically blending into a spring friction resistance, the mechanism being characterized by the fact that the substantially straight spring resistance is effected through friction elements functioning as pressure-transmitting members and which thereafter become true friction-generating elements in conjunction with co-operating friction means.

Other objects and advantages of the invention will more clearly appear from the description and claims hereinafter following.

In the drawing forming a part of this specification, Figure 1 is a longitudinal, sectional view of a portion of a railway draft rigging showing my improvements in connection therewith, the section through the friction elements and the wedge corresponding to two sectional planes intersecting at an angle of 120°. Figure 2 is a vertical, transverse, sectional view corresponding substantially to the line 2—2 of Figure 1. Figure 3 is a partial, horizontal sectional view of the friction system and co-acting parts, illustrating the position assumed by the parts at the end of the initial action of the mechanism. And Figure 4 is a view similar to Figure 3 showing the position of the parts when the mechanism is fully compressed.

In said drawing, 10—10 denote the usual channel-shaped draft sills of a railway car underframe, to the inner faces of which are secured front stop lugs 11—11 and rear stop lugs 12—12. A portion of the drawbar is indicated at 13, the same being operatively associated with a yoke 14 of well known form, within which is disposed the shock absorbing mechanism proper, hereinafter described, and front and rear main followers 15 and 16. The yoke and the parts therewithin are supported in operative position by a detachable saddle plate 17. As illustrated, the shock absorbing mechanism is of that type employing a substantially cylindrical shell and spring cage, and in order to maintain the latter in central position, suitable guide plates 18—18 are secured to the inner faces of the draft sills.

The improved shock absorbing mechanism proper, as shown, comprises broadly, a combined friction shell and spring cage casting A; a spring resistance B; three wedge friction shoes C—C; a central wedge D; a spring follower cap E; and a retainer bolt F.

The combined friction shell and spring cage casting A is of substantially cylindrical form throughout its length with the friction shell proper 19 formed at the front or forward end and the spring cage proper 20 rearwardly thereof. The casting has a transverse, rear, vertical wall 21 which coacts with the rear follower 16. The interior of the friction shell 19 is provided with three, independent, cylindrical friction surfaces 22—22 converging inwardly of the shell, and preferably so disposed that, at the rear ends the faces 22 will merge, forming a complete true circle.

The three friction shoes C—C are of like construction, and each is formed with an outer, true cylindrical friction surface 122 adapted to co-operate with one of the shell friction surfaces 22. On the inner side, that is, the side adjacent the longitudinal axis of the mechanism, each shoe has a lateral projection 23 provided with a front wedge face 24. At the forward end, each shoe is provided with a flat face 25 adapted to coact with the main follower 15 and normally abutting the latter.

The wedge D, as shown, is in the form of a cast block, suitably cored, having a flat front face 26 and three rearwardly converging wedge faces 124 arranged around the axis of the mechanism adapted to coact respectively with the faces 24 of the three shoes C.

The spring follower cap E comprises a cup-shaped, forwardly extending section 27 provided with a laterally projecting, heavy annular flange 28 at its inner end, adapted to engage the rear ends of the friction shoes C. The annular flange 28 is engaged on its opposite side by the forward end of the outer heavy coil of the spring resistance B. The inner lighter coil of the spring resistance has its forward end seated in the cup shaped section 27 of the spring follower E. The rear ends of the outer and inner coils of the spring resistance B respectively engage the rear wall 21 of the casting A and a hollow boss 29 integral with the said rear wall 21 and inwardly projecting therefrom.

The overall length of the mechanism is maintained by the retainer bolt F, which is suitably anchored at its inner end in the hollow boss 29 and at its forward end within the cored recess of the wedge D. The retainer bolt is preferably of such a length and is so adjusted as to maintain the spring B under initial compression and the forward end of the wedge block D normally spaced from the follower 15, as clearly shown in Figure 1.

With the parts in normal position, as shown in Figure 1, it is evident that there will be no true wedging or spreading action from the wedge D to the shoes until the wedge is engaged by the front follower. Consequently, as the compression stroke is initiated, the effective resistance is provided solely by the spring B, with the addition of such slight friction as may be present due to the shoes engaging the friction surfaces of the shell and without any substantial or appreciable lateral spreading action thereon. At this time, it will be noted that the actuating pressure is applied directly from the follower 15 to the ends of the shoes and, as hereinbefore pointed out, without any true wedging or spreading action. As the compression stroke continues, the friction shoes will be forced inwardly of the shell and compelled to approach each other laterally as they travel down the tapered or inclined shell friction surfaces 22. During this action, the wedge faces of the shoes and wedge D will be loose, leaving the wedge substantially free until the forward end is engaged by the front follower and carried idly inwardly. This action continues until the wedge faces 24 of the shoes, due to the convergence of the friction surfaces of the shell, are brought into effective engagement with the wedge faces 124 of the wedge. This position is clearly shown in Figure 3. At this stage of the compression stroke, it is evident that there will be an automatic change from the initial, substantially pure spring resistance, (plus such slight frictional resistance as may occur between the shoes and shell), to an augmented frictional resistance induced by the spreading action of the wedge D co-operating with the friction shoes. As the compression stroke continues from this point on, the shoes will be made to approach each other still further and the overall length of the wedge system will be increased and the outer ends of the friction shoes withdrawn from contact with the follower 15. The position of the parts when the mechanism is fully compressed is that shown in Figure 4. When this stage of the operation is reached, the front follower 15 will engage the outer end of the casting A and the force will be transmitted to the rear stop lugs directly through the shell and the follower 16, thereby preventing the spring resistance B from being driven solid.

As will be evident to those skilled in the art, by properly proportioning the parts, the amount of preliminary spring action and the time of change from this action to the heavier frictional action, can be regulated as desired. The change from easy action to the wedge friction, however, is not only accomplished automatically, but is easy and gradual, thus avoiding sudden changes in the resistance of the mechanism to shocks.

Due to the initial spring action of my improved gear, the same is particularly adapted for use on passenger cars, the spring being preferably made of such a capacity as to entirely absorb the ordinary shocks incident to starting and stopping of the train and also take care of the tractive effort of the locomotive during the time that the train is in motion, before the friction system becomes active. The shock absorbing capacity of the spring resisted friction mechanism of the gear is thus available as a reserve for absorbing the heavier shocks, during the time that the train is in motion in addition to the unusually heavy shocks in starting and stopping.

I have herein shown and described what I now consider the preferred manner of carrying out my invention, but the same is merely illustrative, and I contemplate all changes and modifications that come within the scope of the claims appended hereto.

I claim:

1. In a friction shock absorbing mechanism, the combination with a friction shell having inwardly converging interior, opposed friction surfaces; of a spring resistance; a wedge member; friction shoes having wedging engagement with the wedge during a predetermined portion of the compression stroke and coacting with said friction surfaces; means relatively movable with reference to the shell for transmitting the actuating pressure direct to said shoes at the beginning of the compression stroke to force the same inwardly of the shell along the converging surfaces thereof, thereby simultaneously effecting lateral approach of said shoes, said means being normally out of contact with the wedge means and adapted to engage and actuate the same after said predetermined compression; and means for positively limiting the outward movement of the wedge with reference to the shell to normally hold said wedge spaced from said means during said predetermined compression.

2. In a friction shock absorbing mechanism, the combination with a main follower; of a friction shell having interior friction surfaces converged inwardly of the shell; of a spring resistance; a plurality of friction shoes cooperable with the friction surfaces of said shell and normally to engaging said follower; a wedge having a plurality of wedge faces co-operating with corresponding wedge faces of the shoes; and means for positively limiting the outward movement of said wedge with reference to the shell to maintain the outer end of the wedge spaced a pre-determined distance from said main follower, when the mechanism is in full release, whereby said wedge is initially free from actuating pressure, but engages said follower after a pre-determined amount of compression to effect co-operating wedge engagement of the faces of said wedge and shoes, as the shoes travel inwardly of the converging friction surfaces.

3. In a friction shock absorbing mechanism, the combination with a main follower; of a friction shell having a plurality of independent, cylindrical, interior friction surfaces converged inwardly of the shell; a spring resistance; a plurality of friction shoes normally engaged by said follower, each shoe having an outer cylindrical friction surface and an inner wedge face; a spring follower interposed between the inner ends of said shoes and the adjacent end of the spring resistance; a wedge having a plurality of wedge faces co-operating with the wedge faces of the shoes; and means for positively limiting the outward movement of said wedge and maintaining the outer end thereof spaced inwardly from the outer ends of said shoes when the mechanism is in full release, said sets of wedge faces automatically becoming effectively engaged as the shoes and wedge travel inwardly of the shell, the outer ends of the friction shoes simultaneously being withdrawn from engagement with said main follower.

4. In a spring friction shock absorbing mechanism, the combination with a member having longitudinally disposed friction surfaces inclined with respect to each other; a spring resistance; friction elements co-operating with the friction surfaces of said member during a portion of the compression stroke; means for directly transmitting the actuating pressure to said elements at the beginning of the compression stroke; wedging means co-operating with said friction elements, during a portion of the compression stroke, to effect true frictional co-operation between said elements and member, said wedging means being free of the pressure of said pressure transmitting means at the beginning of the compression stroke, and said means for transmitting the actuating pressure co-operating with said elements to transmit the force through said elements to the spring resistance, with said elements acting as pressure-transmitting members and substantially free from frictional co-operation with said member during a portion of the compression stroke, the inclined surfaces of said member effecting an automatic transference of the actuating pressure to said wedging means and thence through said friction elements during another portion of the compression stroke of the mechanism.

5. In a friction shock absorbing mechanism, the combination with a friction member having friction surfaces inclined with respect to the line of compression of the mechanism; of a pressure transmitting means; a spring resistance; friction elements co-operating with friction surfaces of said member during one portion of the compression stroke of the mechanism and, during another portion of the compression stroke, directly co-operating with said means and transmitting the actuating force substantially directly to the spring resistance; wedging means substantially ineffective as such during said last mentioned portion of the compression stroke with respect to said friction elements, said wedging means directly co-operating with said pressure transmitting means and being rendered co-operatively effective with said friction elements during another portion of the compression stroke while receiving the actuating force, the actuating force being transmitted from said wedging means to and through said friction elements; and means for normally maintaining said wedge means and pressure transmitting means out of actual contact.

In witness that I claim the foregoing I have hereunto subscribed my name this 19th day of May 1924.

GEORGE A. JOHNSON.